Sept. 5, 1933.　　　　R. H. BROWNLEE　　　　1,925,130
PRODUCTION OF CARBON BLACK
Filed Dec. 26, 1931
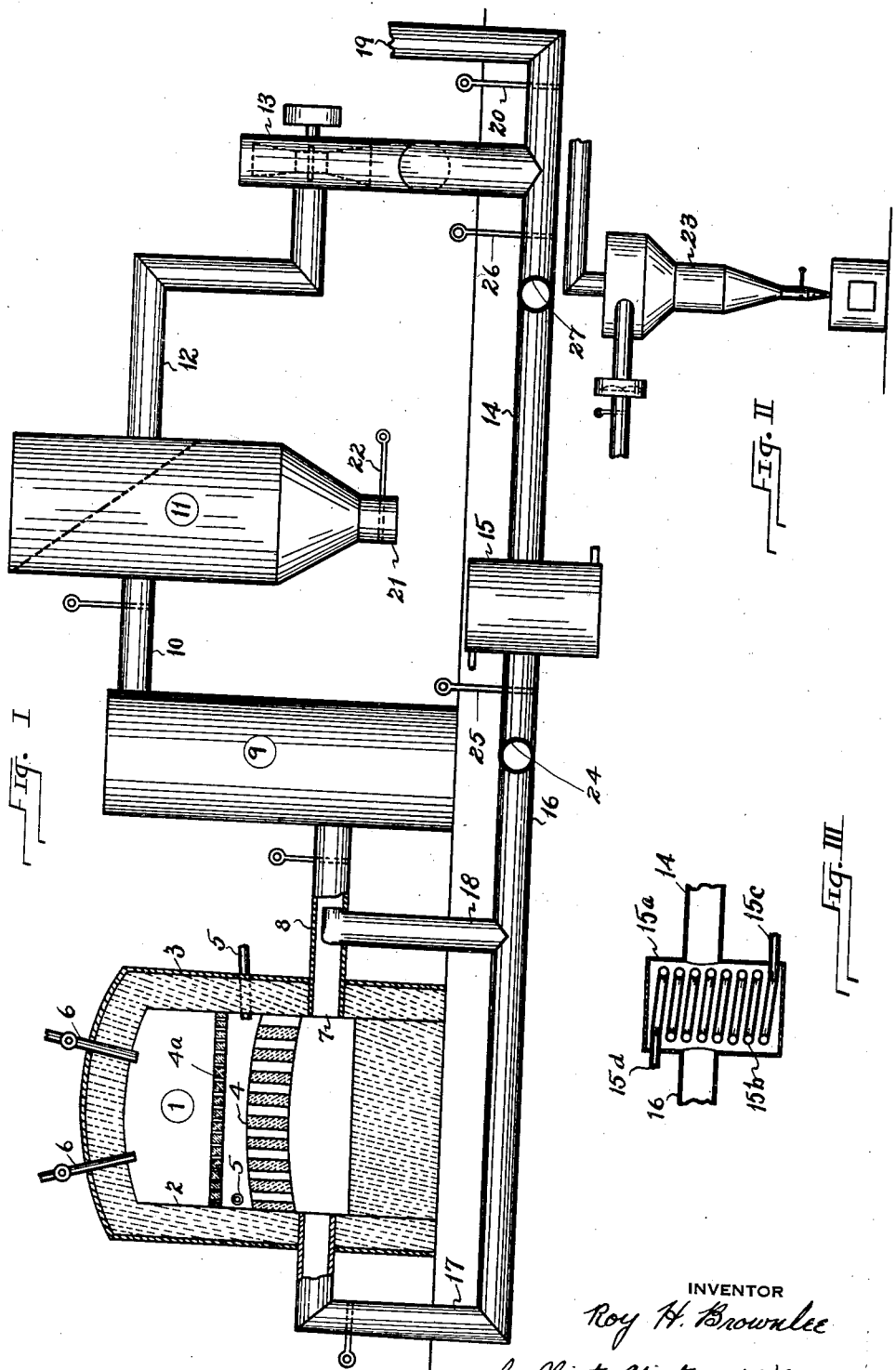
INVENTOR
Roy H. Brownlee
by Christy, Christy and Wharton
his attorneys

Patented Sept. 5, 1933

1,925,130

UNITED STATES PATENT OFFICE 1,925,130

PRODUCTION OF CARBON BLACK

Roy H. Brownlee, Pittsburgh, Pa.

Application December 26, 1931
Serial No. 583,369

6 Claims. (Cl. 134—60)

This invention relates to a method of causing instantaneous cooling of carbon black produced by a disassociation process.

In general the method herein described and claimed is described, but not claimed, in my copending application Serial No. 446,849, filed April 24, 1930 for a method of producing carbon black, of which this is in part a continuation. While the present method and apparatus are particularly desirable for use in connection with the method of the above noted application, for the reason that carbon black produced by that method is of particularly high quality and the immediate cooling prevents deterioration from such high quality, it is of general advantage in connection with any method which produces carbon black by disassociation or partial combustion, and in which immediate cooling may prevent destruction of its desirable properties by a continued heating.

As above indicated, carbon black deteriorates rapidly after its production by combustion or disassociation of the hydrocarbon from which it is obtained, if it is not quickly reduced to a temperature materially lower than the temperature at which it is formed. If the temperature is not quickly reduced, but the carbon black is subjected to a temperature approximating the temperature of its formation even for a relatively short period of time, some of the resulting product is gray in color, and is of a gritty or graphitic consistency. Such coked carbon black is valueless commercially.

It is further a fact that carbon black must be reduced in temperature prior to its collection to cause agglomeration sufficient to permit an efficient separation of the carbon black from the gases with which it is commingled. It would also burn the fabric sacks commonly used as collectors, if not greatly reduced in temperature, and being in finely divided form, would of itself ignite when exposed to air if not materially reduced in temperature.

One object of the invention is to cause a quick drop in the temperature of the mixture of carbon black particles and gases following immediately upon their production by disassociation.

Another object of the invention is to so conduct the cooling and separation of the carbon black that the temperature drop may be merely sufficient to permit collection of the carbon black and to prevent ignition of the carbon black particles on their issuance from an inert atmosphere.

In the accompanying exemplary drawing Figure I is a diagrammatic elevational view showing in vertical section a furnace for the production of carbon black by disassociation, together with a cooling, collecting, and separating assembly connected with the furnace; Figure II is an elevational view of an alternative type of separator and collector for the carbon black; and Figure III is a vertical sectional view through a suitable refrigerating element.

Primarily the method of my invention consists in recirculating gases produced by disassociation of a hydrocarbon for the formation of carbon black from the means or region in which carbon black is separated from the gases, through refrigerating apparatus, to a region or regions at or adjacent the discharge outlet or outlets from the disassociating furnace. By so recirculating the gases a quick drop in temperature is obtained in the stream of mixed gas and carbon black as it passes from the disassociating zone in the furnace, so that the period during which the carbon black itself is subjected to the temperature of its disassociation in definitely limited and extremely brief. As above noted, this prevents any deterioration of the carbon black because of subjection to high temperature. In this connection it may be noted that any substantial temperature drop below the lower limits of the disassociation range prevents deterioration of the carbon black, while deterioration is less marked at the lower limit of the disassociation range than at the upper limit thereof. For example we may take the disassociation range of hydrocarbon gas into carbon black and gases as from 1000° centigrade to 1400° centigrade. If the temperature of the gas stream containing the carbon black be caused to drop immediately to approximately 800° centigrade no substantial deterioration occurs. Further if we assume that the gases and carbon black are at a temperature of 1200° centigrade, an immediate temperature drop to approximately 1000° centigrade will greatly reduce the deteriorating effect of continued high temperature.

In the exemplary drawing illustrating one form of apparatus suitable for conducting my method, I show a furnace 1 having a refractory lining 2 and an insulating shell 3. Disposed part way of the height of the furnace is a checkerwork structure 4, of relatively slight vertical extent, and arranged to be heated by gas burners 5 which introduce a combustible mixture of gas and air into the furnace. Desirably these burners are arranged with a slight downward inclination to project the combustible mixture against the upper side of the checkerwork, and are so arranged that the streams of combustible mixture have a generally tangential direction. Such positioning of the burners produces a swirling movement of the combustible mixture and flame around, and upon the upper surface of, the refractory members of checkerwork 4.

Inlets 6 for hydrocarbon gas to be disassociated are arranged to deliver gas downwardly into and through the disassociation zone of the furnace, which comprises the checkerwork 4 and the sheet or layer of flame adjacent the upper surface of the checkerwork. Below checkerwork 4 is an outlet 7 from which products of decomposition in the furnace pass through outlet pipe 8 to a cooler 9. From cooler 9 a pipe 10 leads to a separator and collector 11. From separator 11 a conduit 12 leads to blower 13, for recirculation of a portion of the gases separated from the solid products of decomposition carried thereby. Blower 13 passes the recirculated gases by way of conduit 14 through refrigerator 15, and by way of conduit 16 and branch pipes 17 and 18, to the outlet pipe 8, leading to cooler 9 and to the furnace in a region below the disassociating zone. Gas which is not recirculated, is discharged by way of conduit 19, controlled by valve 20. Valve 20 is used for proportioning the gas discharged and the gas recirculated for cooling. The separated carbon black itself is discharged by way of conduit 21 provided with a discharge valve 22.

Desirably I may add a perforated refractory screen 4a spaced a relatively short distance above the checkerwork 4. The function of this refractory screen is to definitely limit the upward extent of the flame, so that the layer of flame is defined in and immediately above the checkerwork.

It is to be understood that the method may be used with various other forms of furnace and various other forms and arrangement of cooling, separating, and circulating means. The special furnace arrangement illustrated has been shown because I have found that the carbon black produced in it, and by the method to which it is adapted, is of particularly high quality; and it is, therefore, of particular advantage to preserve the qualities of the carbon black as initially produced.

In forming the carbon black, checkerwork 4 is heated by the combustion of gas from burners 5, which heats the checkerwork and provides a layer of flame lying in and upon the checkerwork. While still continuing combustion to maintain the temperature of the checkerwork, and to provide the sheet or layer of flame, the hydrocarbon for disassociation is introduced through inlets 6, each of which is directed downwardly toward the disassociation zone of the furnace. The hydrocarbon for disassociation is desirably natural gas, consisting substantially entirely of methane, but it may be any suitable hydrocarbon gas or liquid capable of disassociation to release free carbon.

As the hydrocarbon undergoing disassociation passes rapidly through the relatively thin disassociation zone comprising the flame and checkerwork, the period of its subjection to high temperature in the disassociation zone itself is very short. Immediately upon its issuance from the disassociating zone, the stream of disassociation products, comprising disassociation gases and free carbon, enters a region in the furnace in which the temperature is reduced materially below the temperature of the disassociation zone by cool gases entering the furnace itself by way of branch conduit 17. Immediately upon its issuance from the furnace, the gaseous mixture containing the free carbon black is further reduced in temperature by the flow of cool gases by way of branch conduit 18 to outlet pipe 8, which leads from the furnace to cooler 9. As shown the connection between furnace 1 and cooler 9 is relatively short. It may, however, be greatly extended if so desired, because of the immediate drop in temperature of the products of disassociation.

Cooler 9 may be of any suitable type, but is desirably a spray cooler in which the temperature of the disassociation products is further lowered prior to separation. If the separator 11 shown in Figure I is of the type in which fabric bags are used for separation of the carbon black from the gases, the mixture of carbon black and gases must be brought to a relatively low temperature in this cooler. This temperature is between the boiling point of water and the temperature at which the fabric bags in separator 11 would be scorched by the heat of the disassociated mixture. In general when separators of this type are used, the temperature of the gaseous mixture should be reduced to approximately 150° centigrade for separation.

No matter what separating means are employed, the carbon black should be reduced to a temperature below its ignition point before it is exposed to air. Assuming that the carbon black is not subjected to additional cooling after separation, the temperature of the carbon black should, irrespective of the exigencies of separation, be reduced at least as low as 500° centigrade before it is permitted to come into contact with air.

If I employ a type of separator other than a fabric bag separator, as for example a centrifugal dust separator 23, such as that shown in Figure II of the drawing, the temperature of the gaseous mixture need not be as low as 150° centigrade for separation of the carbon black and gases. In such case it is necessasry to lower the temperature of the mixture to such point that the carbon black will agglomerate sufficiently for separation, and that it be below the ignition point of the carbon if the carbon black is to be discharged and subjected to air without additional separate cooling. It may be noted that the cooler 9, in addition to its function of lowering the temperature of the mixed stream of gases and carbon, serves also as an expansion chamber, and thus tends further to produce adequate agglomeration of the carbon black.

Normally I prefer to operate at a temperature of from 200° centrigrade to 350° centigrade, when a separator of the dust collector type is employed. I may wish, however, to discharge a portion of the separated gases from the system at a relatively high temperature. This may be the case if, for example, it is desired to use the gases for the fixation of nitrogen, or other useful purposes at which a high temperature is desired. Under such circumstances, I maintain the gaseous mixture at as high a temperature as is consistent with proper agglomeration and efficient separation. If necessary the separated carbon black discharged by way of conduit 21, may then be subjected to additional cooling before its exposure to the air. It should be noted that the use of a non-combustible separating means, such as a centrifugal dust collector, permits the retention of a relatively high temperature of the gaseous mixture during separation. If, therefore, such type of separator be employed, and the refrigeration of the recirculated gas be stressed, it is possible to eliminate the spray cooling step from the general process.

Refrigerator 15 through which the recirculated portion of gases is passed, may be of any desired type, such as a cooler comprising water brine or ammonia coils. The refrigerator illustrated comprises a shell 15a, the interior of which is in communication with conduits 14 and 16. Within shell 15a is a coil 15b, having an inlet 15c and an outlet 15d for refrigerating fluid.

The further cooling effected in the refrigerator will depend largely upon the temperature drop effected in the initial cooler 9. Thus if a fabric bag separator is used, and the carbon black is cooled to a temperature of approximately 150° centigrade prior to separation, the additional cooling required is relatively slight; if on the contrary a centrifugal dust separator is employed, and the gaseous mixture passes from the separator at a higher temperature range, a greater cooling effect must be exercised in refrigerator 15. In either case the gases are repassed to the outlet end of the furnace at a relatively low temperature, desirably at a temperature not greatly in excess of 100° centigrade.

It has been explained above that the immediate temperature drop produced by recirculation of the cooled gases is of great advantage in obtaining a high grade of carbon black. The recirculation of the gases produced by disassociation is the most practical manner of obtaining such gaseous cooling of the products, as recirculation gases, products of disassociation in the furnace, are inert in so far as the decomposition products composing the stream issuing from the furnace is concerned. A stream of cool gas inert under the conditions of the process may, however, be added from an external source. Such an external gas may be added between the furnace and the refrigerator 15 by closing valve 25 in conduit 16 and introducing the gas through pipe 24. It may also be added for refrigeration, by closing valve 26, and introducing it through pipe 27.

It is of course possible, and may prove advantageous, to so arrange two or more furnaces, that the cool gas commingled with the mixed products of one furnace is the separated product of another furnace in which a similar process of disassociation of a hydrocarbon into carbon black and gas is conducted.

By reducing the temperature of the gaseous mixture merely to the point of proper agglomeration for separation, the heat of such portion of the separated gases as is discharged from the system may be conserved for additional useful purposes. This is also the case to a somewhat lesser extent if the gaseous mixture is reduced, prior to separation, to a temperature at which the separated carbon black may be discharged to the atmosphere without further cooling.

It may be additionally noted that the introduction of the relatively cool gases to the stream of hot mixture issuing from the furnace, dilutes and agitates the hot mixture of carbon black and gases. This produces a precipitating tendency which of itself contributes to the agglomeration necessary for adequate separation of the carbon black from the gases.

I claim as my invention:

1. Apparatus for the production and collection of carbon black by and from a disassociation process comprising a disassociation furnace, a relatively thin layer of checkerwork therein, means for producing combustion on and between the elements of the checkerwork, means for passing hydrocarbon for disassociation through the zone of combustion and the checkerwork heated thereby thus disassociating it into carbon black and gases, means effective to lower the temperature of the mixed products of disassociation in a region adjacent the region of disassociation, and means for mutually separating the carbon black and the gases commingled therewith.

2. Apparatus for the production of carbon black by a disassociation process comprising a disassociation furnace, a relatively thin layer of checkerwork therein, means for producing combustion on and between the elements of the checkerwork, means for passing hydrocarbon for disassociation through the zone of combustion and the checkerwork heated thereby, and a refractory screen lying between the checkerwork and the means for introducing gas for disassociation positively to limit the thickness of the zone of combustion.

3. Apparatus for the production of carbon black by a disassociation process comprising a disassociation furnace, a relatively thin layer of checkerwork therein, means for producing combustion on and between the elements of the checkerwork, means for passing hydrocarbon for disassociation through the zone of combustion and the checkerwork heated thereby thus disassociating it into carbon black and gases, and means effective to lower the temperature of the mixed products of disassociation in a region adjacent the region of disassociation.

4 Apparatus for the production and collection of carbon black by and from a disassociation process comprising a disassociation furnace, a relatively thin layer of checkerwork therein, means for producing combustion on and between the elements of the checkerwork, means for passing hydrocarbon for disassociation through the zone of combustion and the checkerwork heated thereby thus disassociating it into carbon black and gases, means for mutually separating the carbon black and the commingled gases, means for refrigerating the gases from which the carbon black has been separated, and connections recirculating such gases through the refrigerating means to a region between the zone of disassociation in the furnace and the means for mutually separating the carbon black and gases produced by disassociation.

5. The herein described method of producing carbon black by thermal decomposition which comprises passing a hydrocarbon through flame and in immediate subjection to the heating effect of refractory heated to at least the disassociation temperature of the hydrocarbon, thereby producing a mixed stream of carbon black and gaseous products, and commingling with the mixed stream of carbon black and gaseous products immediately after its formation cooled gaseous products of a similar disassociation.

6. The herein described method of producing carbon black by thermal decomposition which comprises passing a hydrocarbon through flame and in immediate subjection to the heating effect of refractory heated to at least the disassociation temperature of the hydrocarbon, thereby producing a mixed stream of carbon black and gaseous products, and immediately after formation of the products diluting the hot stream thereof with a relatively cool gas inert as to those products under the existing conditions of the process.

ROY H. BROWNLEE.